United States Patent [19]

Miller et al.

[11] Patent Number: 5,591,319

[45] Date of Patent: Jan. 7, 1997

[54] ELECTROLYTIC PRE-ENRICHMENT METHOD AND APPARATUS FOR THE COMBINED ELECTROLYSIS AND CATALYTIC EXCHANGE PROCESS

[75] Inventors: Alistair I. Miller, Deep River; Andrew T. B. Stuart, Etobicoke; Allan E. Everatt, Deep River, all of Canada

[73] Assignee: Atomic Energy of Canada Limited/Energie Atomique du Canada Limitee, Ontario, Canada

[21] Appl. No.: 438,480

[22] Filed: May 10, 1995

[51] Int. Cl.$^6$ ................ C25B 1/04; C25B 9/00; C25B 15/08

[52] U.S. Cl. ............ 205/627; 205/628; 205/633; 205/637; 204/270

[58] Field of Search .................... 204/129, 149, 204/269–270; 205/627, 628, 633, 637

[56] References Cited

U.S. PATENT DOCUMENTS

| | | | |
|---|---|---|---|
| 2,690,380 | 9/1954 | Taylor | 204/101 X |
| 2,780,526 | 2/1957 | Fleck | 205/627 |
| 3,098,020 | 7/1963 | Dirian et al. | 205/627 X |
| 3,256,163 | 6/1966 | Winsel et al. | 204/101 |
| 3,306,832 | 2/1967 | Lewis et al. | 204/101 |
| 3,974,048 | 8/1976 | Hammerli et al. | 204/101 |
| 4,190,515 | 2/1980 | Butler et al. | 204/266 |
| 4,191,626 | 3/1980 | Hammerli et al. | 204/266 |
| 4,225,402 | 9/1980 | LeRoy et al. | 204/129 |
| 4,331,522 | 5/1982 | Pievini | 205/627 |

*Primary Examiner*—Donald R. Valentine
*Attorney, Agent, or Firm*—Sughrue, Mion, Zinn, Macpeak & Seas

[57] ABSTRACT

An electrolytic pre-enrichment of a feed stream to a combined electrolysis and catalytic exchange ("CECE") heavy water production process. A deuterium enriched liquid or vapour stream from electrolytic cells is applied as a feed to the first stage of a CECE deuterium enrichment process. By deploying a portion of available electrolytic cell capacity in the pre-enrichment stage, advantages are achieved, particularly where available electrical power fluctuates or when a "turned down" CECE process is desired.

8 Claims, 3 Drawing Sheets

ELECTROLYTIC PRE-ENRICHMENT METHOD AND APPARATUS FOR THE COMBINED ELECTROLYSIS AND CATALYTIC EXCHANGE PROCESS

FIELD OF THE INVENTION

This invention relates to electrolytic pre-enrichment of a feed stream to a combined electrolysis and catalytic exchange ("CECE") heavy water production process.

BACKGROUND OF THE INVENTION

The CECE heavy water production process extracts heavy water from normal water by a combination of electrolysis and catalytic exchange between the water feeding electrolytic cells and the hydrogen produced in them. The CECE process has previously been described in U.S. Pat. No. 3,974,048 issued to Atomic Energy of Canada Limited on Aug. 10, 1976.

The primary components of a normal multi-stage CECE process are each stage's hydrogen water catalytic exchange enrichment columns, oxygen-stream vapour scrubber columns and electrolytic cells. The catalytic exchange columns enrich water flowing down the column by stripping deuterium from the up-flowing hydrogen gas, with conditions always favouring deuterium transfer to the liquid. Electrolytic cells provide a bottom reflux flow by converting the enriched liquid leaving the catalytic exchange column into hydrogen gas. The electrolytic cells in a CECE process not only provide a bottom reflux flow but also enrich the cell liquid inventory.

For economic reasons, the CECE process usually exploits electrolysis installations that are associated with major electrical generating facilities, typically hydro-electric generating facilities. Many electrical power generating facilities are built solely to meet the diurnal peak electricity demand. During off-peak periods, excess electrical generation capacity is diverted to electrolytic cells to produce hydrogen. As the demand for electricity fluctuates through peak and off-peak periods, the availability of electricity for electrolytic processes fluctuates accordingly. This is accommodated by either bringing more electrolytic cells on line or shutting down electrolytic cells as required. In conventional installations where the electrolytic cells are used to produce hydrogen gas, the process can readily accommodate fluctuations in electrolytic cell capacity without adversely affecting the process parameters. However, in installations in which the electrolytic cells are used in a heavy water CECE process, fluctuations in electrolytic cell capacity has a profound effect on the process parameters. In a conventional CECE process, the cascaded separation stages take about 10 hours or more to achieve a steady state concentration profile. By shutting down electrolytic cells to accommodate peak electrical power demand, the concentration profile throughout the CECE stages is disrupted and production of heavy water is substantially reduced.

In CECE installations, a significant portion of the capital cost of the installation is the expense of the catalyst charge in the exchange columns. In a full-scale CECE installation, the catalyst can be 30%–60% of the total investment cost. The economics governing any specific application could dictate that a "turned down" CECE process be used. This is conventionally achieved by using less than the optimum (for full scale) volume of catalytic exchange packing in the first stage columns. As the catalyst volume in the first stage is decreased, the amount of deuterium stripped from the exiting hydrogen gas is reduced resulting in a reduced deuterium recovery.

SUMMARY OF THE INVENTION

In the present invention, it has been found that a portion of the available electrolytic cell capacity can be advantageously deployed to form a pre-enriched feed stream before it undergoes any enrichment by exchange with hydrogen in a normal CECE process. Conditions particularly useful for the deployment of the present invention include fluctuating electrolytic cell availability, or where a "turned down" CECE process capacity is desired.

In accordance with one aspect of the present invention, there is provided a method for producing heavy water comprising deriving a deuterium enriched liquid or vapour stream from electrolytic cells and applying said stream as a feed to a first stage of a CECE deuterium enrichment process. The feed can be a deuterium enriched liquid stream derived from the liquid condensate from the electrolysis cell applied to the catalytic exchange column of the first stage of the CECE process or an electrolytic hydrogen gas stream containing deuterium enriched water vapour applied in deuterium exchange relation with the liquid feed water to said first CECE stage.

In accordance with another aspect of the present invention there is provided in a CECE heavy water production system having a series of cascaded stages, each stage comprising a catalytic exchange column for passing liquid water in deuterium exchange relation with hydrogen gas and electrolysis cells for evolving from the liquid water stream from said catalytic exchange column a deuterium enriched liquid condensate, hydrogen gas and oxygen gas, wherein said hydrogen gas is returned to said catalytic exchange column and a portion of said deuterium enriched liquid condensate is passed to the catalytic exchange column of the next CECE stage; a pre-enrichment stage comprising electrolysis cells for evolving from a liquid feed water stream a deuterium enriched liquid condensate and hydrogen and oxygen gas streams containing deuterium enriched water vapour; means for scrubbing deuterium enriched water vapour from said pre-enrichment stage hydrogen and oxygen gas streams with said feed water stream; means for passing deuterium enriched liquid condensate from said pre-enrichment stage to the catalytic exchange column of the first CECE stage; and means for scrubbing deuterium enriched water vapour from the hydrogen gas stream from the catalytic exchange column of the first CECE stage with feed water thereto.

In accordance with another aspect of the present invention, there is provided, in a CECE heavy water production system having a series of cascaded stages, each stage comprising a catalytic exchange column for passing liquid water in deuterium exchange relation with hydrogen gas and electrolysis cells for evolving from the liquid water stream from said catalytic exchange column a deuterium enriched liquid condensate, hydrogen gas and oxygen gas, wherein said hydrogen gas is returned to said catalytic exchange column and a portion of said deuterium enriched liquid condensate is passed to the catalytic exchange column of the next CECE stage; a pre-enrichment stage comprising electrolysis cells for evolving from a liquid water feed stream a deuterium enriched liquid condensate, and hydrogen and oxygen gas streams containing deuterium enriched water vapour; means for scrubbing deuterium enriched water vapour from said pre-enrichment stage oxygen stream with said feed water stream; means for passing the hydrogen gas stream with its associated deuterium enriched water vapour from said pre-enrichment stage and the hydrogen gas from said first CECE stage in deuterium exchange relation with the liquid feed water to said first CECE stage.

BRIEF DESCRIPTION OF THE DRAWINGS

In drawings which illustrate embodiments of the invention.

DETAILED DESCRIPTION OF PREFERRED EMBODIMENTS

Figure 1:
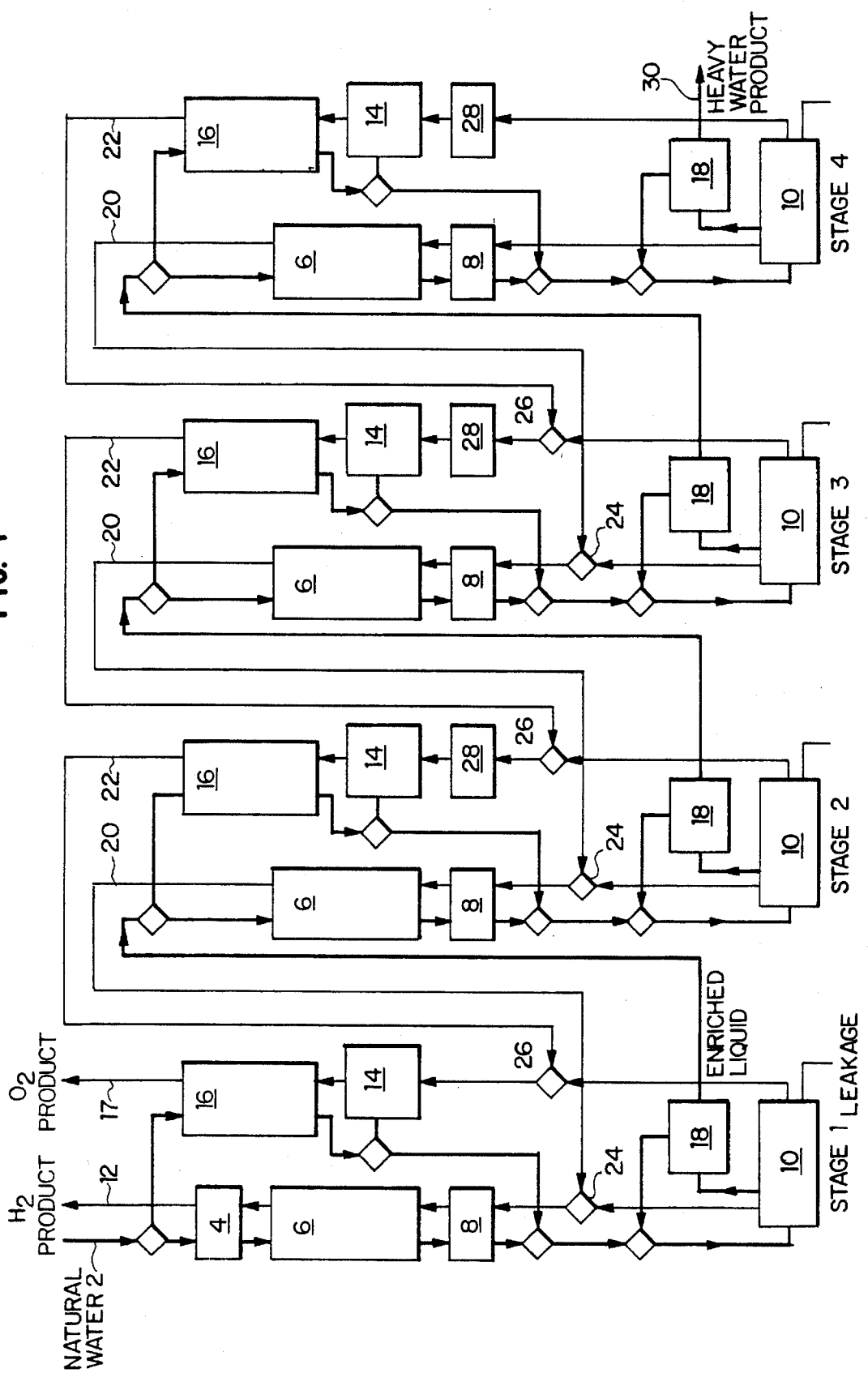
FIG. 1 is a flow diagram of a 4 stage conventional CECE process.

Referring to FIG. 1, there is illustrated a 4 stage normal CECE ("N-CECE") process. The process is similar to that described in U.S. Pat. No. 3,974,048. Input feed liquid water from feed source 2 passes down through a deuterated vapour scrubber 4, hydrogen gas/liquid water deuterium exchange catalyst column 6, vapour-liquid equilibrator 8 and into electrolytic cells 10. Hydrogen gas generated in electrolytic cells 10 flows up through equilibrator 8, catalyst column 6, scrubber 4 and is removed from the process at point 12. Oxygen gas generated in electrolytic cells 10 flows up through cooler 14, deuterium vapour-scrubber 16 and is removed from the process at point 17. The liquid condensate generated by electrolytic cells 10 is passed through reverse osmosis feed-forward unit 18 and to the second stage as feed.

Catalyst column 6 contains a packed catalyst bed in which the hydrogen gas and liquid water pass in countercurrent exchange relation. The catalyst is wet-proofed, hydrophobic and active in the presence of water. The preferred catalyst material is a Group VIII metal having a liquid-water repellant organic polymer or resin coating thereon selected from the group consisting of polyfluorocarbons, hydrophobic hydrocarbon polymers of medium to high molecular weight, and silicones, and which is permeable to water vapour and hydrogen gas. These types of catalysts are described in U.S. Pat. Nos. 3,981,976 and 4,126,687. In catalyst column 6, deuterium is stripped from the upflowing hydrogen gas and is transferred to the down-flowing liquid water.

Electrolytic cells 10 not only provide a bottom reflux by converting the deuterium enriched liquid leaving catalyst column 6 into hydrogen gas, but also enrich the electrolytic cell liquid inventory. The electrolytic hydrogen produced in electrolytic cells 10 is depleted in deuterium relative to the electrolyte by virtue of the kinetic isotope effect inherent in the hydrogen evolution reaction. The electrolytic cell separation factor is typically 5–6.

The enriched liquid inventory, passes through purification (e.g. by reverse osmosis) unit 18 which removes the electrolyte material and constitutes the liquid feed to the next stage for further enrichment. Scrubber 4 prevents the loss of water vapour with a substantially enriched deuterium content by scrubbing with natural water. Equilibrator 8 brings the deuterium concentration of water vapour in the hydrogen gas stream into isotopic equilibrium with the liquid water input. Oxygen stream deuterium vapour-scrubber 16 scrubs deuterated water vapour from the electrolytic oxygen stream, returning the deuterium to electrolytic cells 10 as liquid water.

Stages 2, 3 and 4 are similarly interconnected and like components are numbered as for stage 1. Hydrogen and oxygen from the successive stages at points 20 and 22 respectively are passed back to the previous stage at points 24 and 26 respectively. Stages 2, 3 and 4 do not need a vapour-liquid equilibrator in the hydrogen line from catalyst column 6 as the line is fed to liquid-vapour equilibrator 8 below catalyst column 6 of the previous stage. Stages 2, 3 and 4 each include hydrogen-oxygen recombiner 28 in the electrolytic oxygen stream. This stream contains small amounts of hydrogen enriched in deuterium and recombination of this hydrogen to form water allows the deuterium to be removed by cooler 14 and vapour scrubber 16. The economic benefit of recombiners in preventing escape of deuterium from a stage must be weighed against their cost. Recombiners are most likely to be economic for the highest stages where the deuterium concentration is high and only a small recombiner is required to treat a relatively small flow. The heavy water product is taken off at point 30 of stage 4.

Figure 2:
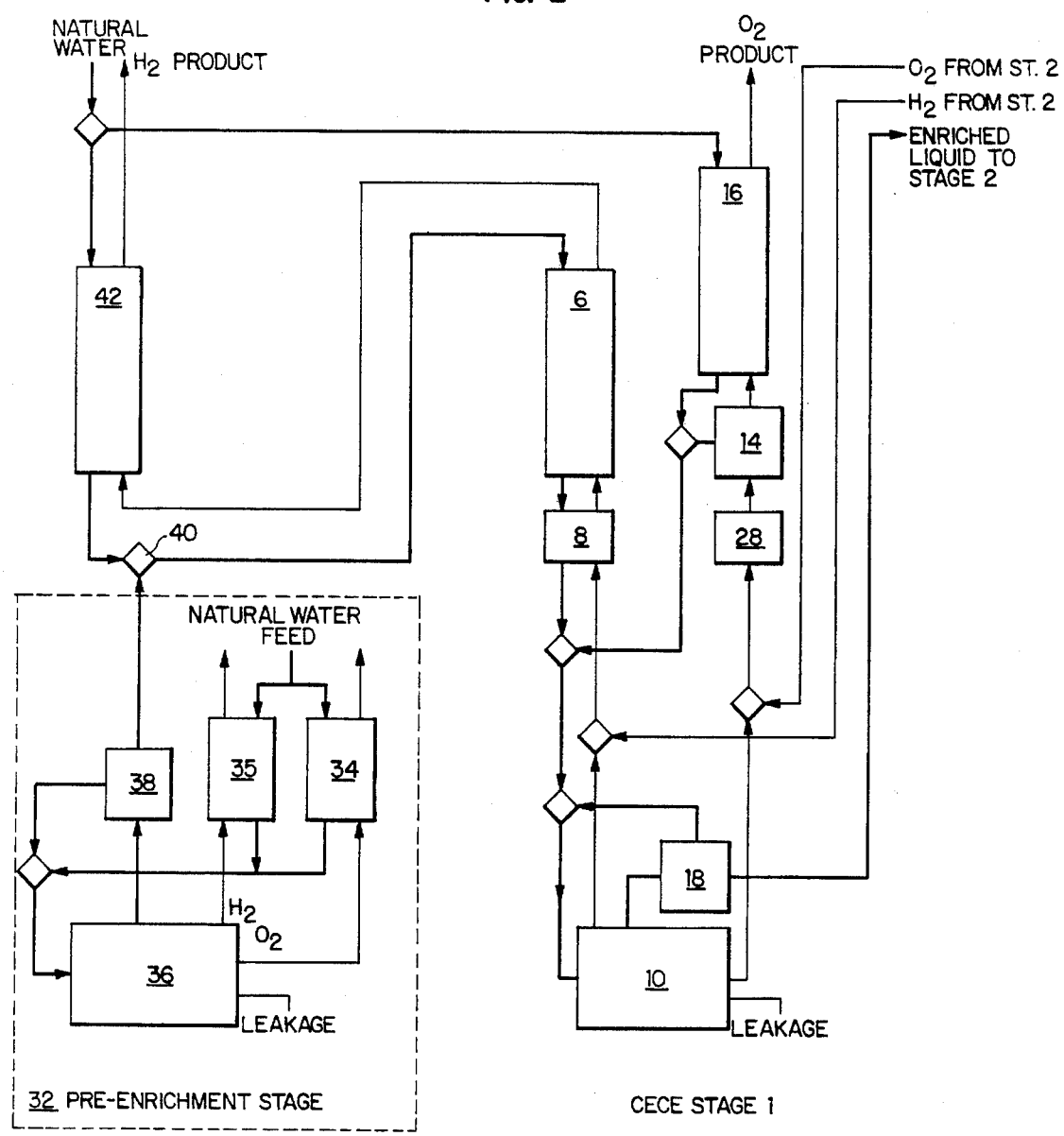
FIG. 2 is a flow diagram of the first stage of a CECE process with an electrolytic liquid pre-enrichment stage.

Referring to FIG. 2, an embodiment of the present invention ("EL-CECE") using electrolytic cells to provide a pre-enriched electrolytic liquid feed to a first stage of a CECE process is shown. The CECE first stage in FIG. 2 is similar to stage 2 of the conventional CECE process of FIG. 1 and comprises catalytic exchange column 6, liquid-vapour equilibrator 8, electrolytic cells 10, purification unit 18, hydrogen-oxygen recombiner 28, oxygen gas stream cooler 14 and oxygen stream deuterium vapour-scrubber 16, all of which operate in the same manner as in the conventional CECE process of FIG. 1.

In pre-enrichment stage 32, natural feed water is passed down through two deuterated vapour scrubbers 34 and 35 for hydrogen and oxygen streams, respectively and into electrolytic cells 36. The electrolytic hydrogen and oxygen gas streams generated by electrolytic cells 36 are passed up through the deuterated vapour scrubbers 34 for the hydrogen stream and 35 for the oxygen stream and each are scrubbed with cell feed water to prevent the loss of deuterium as water vapour before passing out of the system. This is desirable because the deuterium concentration in the vapour is substantially above cell feed water and represents a significant loss.

The pre-enriched liquid stream, as condensate from drying the electrolytic gases from electrolytic cells 36, is passed through purification unit 38 which deionizes the feed before it is introduced into the first CECE stage at junction point 40. Deuterium vapour scrubber 42 scrubs deuterated water vapour from the hydrogen stream from catalyst column 6 of CECE stage 1.

Figure 3:
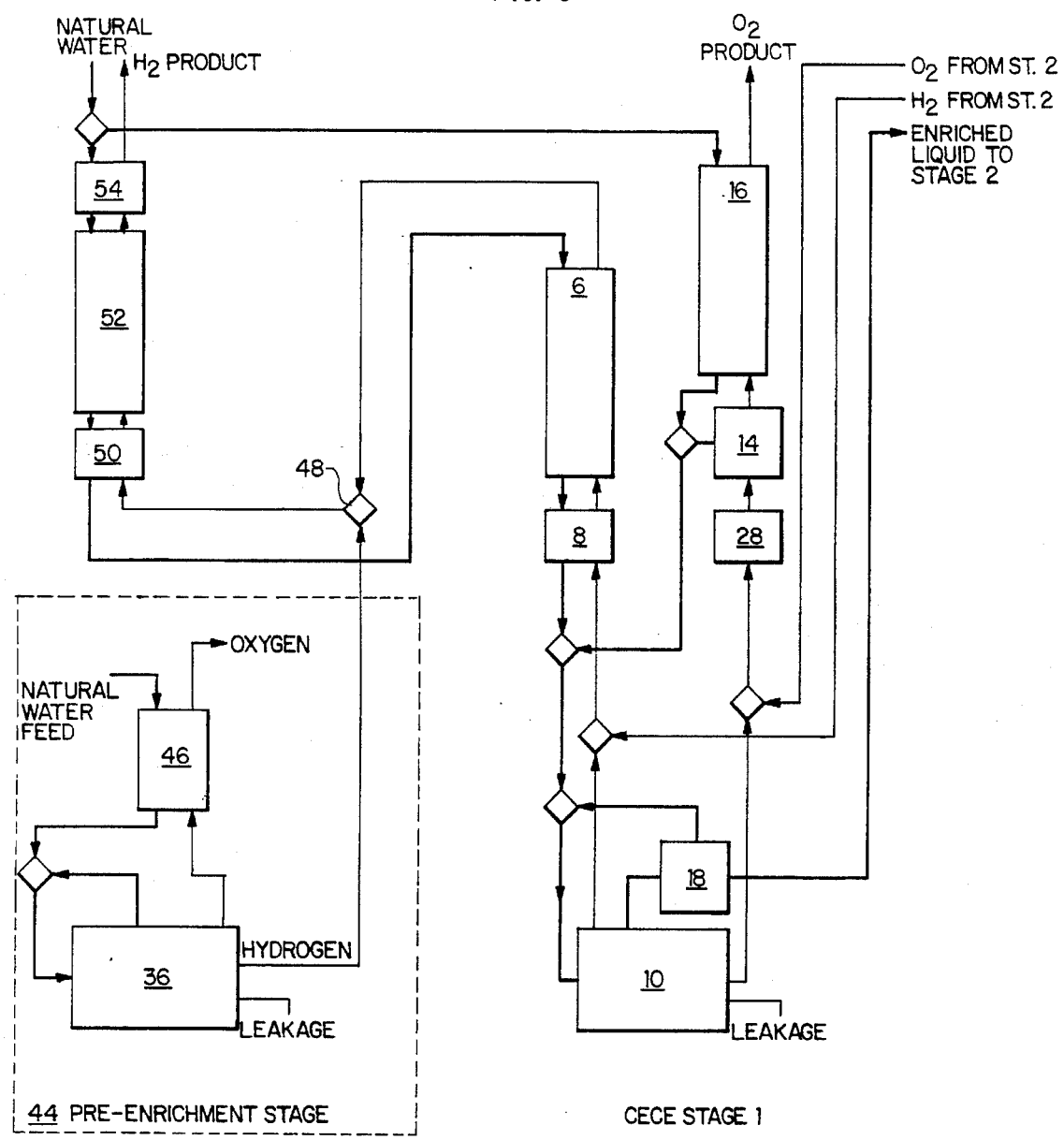
FIG. 3 is a flow diagram of the first stage of a CECE process with an electrolytic gas pre-enrichment stage.

Referring to FIG. 3, an alternative embodiment of the present invention ("EG-CECE") using electrolytic cells to provide a pre-enriched electrolytic gas feed to a first stage of a CECE process is shown. The CECE first stage in FIG. 3 comprises catalytic exchange column 6, liquid-vapour equilibrator 8, electrolytic cells 10, purification unit 18, hydrogen-oxygen recombiner 28 (optional), oxygen gas stream cooler 14 and oxygen stream deuterium vapour-scrubber 16, all of which operate in the same manner as in the CECE stage 1 of FIG. 2.

In pre-enrichment stage 44, natural feed water is passed down through deuterium vapour scrubber 46 and into electrolytic cells 36. The electrolytic oxygen gas stream generated by electrolytic cells 36 is passed up through deuterium vapour scrubber 46 and is scrubbed with cell feed water to prevent the loss of deuterium as water vapour before passing out of the system.

The humid hydrogen gas stream generated by electrolysis cells 36 is introduced into the first CECE stage at junction point 48. Although the hydrogen in this stream is slightly depleted in deuterium relative to the concentration of natural water, as elemental hydrogen and because of the large equilibrium factor favouring concentration of deuterium in water over hydrogen, said hydrogen has considerable capacity for transferring deuterium to water in catalytic exchange column 52.

Hydrogen leaving exchange column 52 passes through deuterated vapour scrubber 54 countercurrent to the natural water feed flow to avoid loss of deuterium as deuterium-enriched vapour. The enriched liquid condensate generated by electrolytic cells 36 is returned to the cells at junction point 51.

The EL-CECE and EG-CECE processes of the present invention ("E-CECE") will not provide the same maximum level of production of heavy water as a conventional CECE process where there are no constraints on CECE plant operation. However, there are circumstances where the E-CECE process is more economically viable than a conventional N-CECE process.

One circumstance where an E-CECE process is an attractive alternative to a N-CECE process is in the utilization of off-peak (electrical grid peak) electrolytic hydrogen production capacity. Where only a portion of the electrolytic cells need to be taken off-line to meet peak electrical demand, the E-CECE process can be configured to take advantage of off-peak hydrogen production capacity by deploying the off-peak electrolytic cell availability in the pre-enrichment stage. The effect of the shut down of the electrolytic cells in the pre-enrichment stage does not compromise the process as does the shut down of electrolytic cells used to reflux the catalyst columns in the CECE process.

The shut down of the pre-enrichment electrolytic cells 36 in the E-CECE process reduces or eliminates the pre-enriched feed stream introduced into the first CECE stage. As a result, the concentration of deuterium in the water feed, and the flow rate of the water feed to catalyst column 6 is reduced. The effect of the excess catalytic capacity of column 6 and the increased residence time will cause column 6 to operate at a higher "pinch", that is, the concentration of deuterium in the hydrogen leaving column 6 will fall and the extraction of deuterium in column 6 will more closely approach the theoretical maximum. With the first stage operating at a higher "pinch", the reduction in deuterium concentration in the feed due to the shut-down of the pre-enrichment stage is somewhat moderated. This is reproduced in successive CECE stages 2 and 3 with the result that the ripple-effect attributable to the initial reduction of deuterium concentration in the feed upon shut-down of pre-enrichment electrolytic cells 36 dies out over successive stages.

The result is that a substantial part of the loss of production due to the large scale transient in process conditions that result from a shut-down of electrolytic cells in a N-CECE process to meet peak electrical demand is avoided. The deployment of electrolytic capacity to a pre-enrichment stage shields the CECE portion of the plant from interruptions in hydrogen production allowing the CECE stages to operate continuously and unimpeded by electrical power diversions.

The EL-CECE process can offer an additional solution to variation in the amount of power available for electrolysis. As water can easily be stored in a tank or other storage means, pre-enriched water from the pre-enrichment stage can be accumulated during periods of high power availability and drawn down during periods of low power availability to maintain a constant flow to junction 40. Thus, the pre-enrichment stage shields the CECE portion of the plant from interruptions in hydrogen production due to electrical power diversion. The EG-CECE could achieve the same result by using a gasholder but water storage is far easier and hence the EL-CECE process is the obvious choice for this situation.

Beside the operational benefits referred to above, deployment of electrolytic capacity to the pre-enrichment stage substantially reduces capital investment with the resultant favourable effect on the rate of return on investment for a E-CECE process compared to an N-CECE plant where a substantial number of electrolytic cells must be shut down during periods of peak electrical demand resulting in poor utilization of the catalyst. Economic analysis has shown that with 55% of the cells shut down at peak load periods an EL-CECE process with a slightly reduced production of 80–90% of the comparable N-CECE process can generate the same level of profits at a significantly lower capital investment and higher capital rate of return.

As an example of the benefits of the E-CECE process, consider the situation of an electrolytic plant with an average output of 177 MW but whose daily operation fluctuates between a period of reduced output for eight hours and enhanced output for the remaining 16 hours. Table 1 shows how the return on investment for an EL-CECE process actually rises as the amplitude of the fluctuations grows while that on the N-CECE process falls steadily. The profit figures in Table 1 are based on a $D_2O$ sale value of 300$/kg and the return on investment is based on a fixed operating cost of 150 k$/a.

TABLE 1

| Type | Electrolytic Plant Size (MW) | Cells Shut Down at Peak (% Total) | CECE Plant Capacity (%) | Production (Mg/a) | Capital Investment (M$) | Gross Profit (M$/a) | Return on investment (%/a) |
| --- | --- | --- | --- | --- | --- | --- | --- |
| EL-CECE | 177.0 | 0 | 85 | 22.84 | 6.32 | 5.03 | 107 |
| EL-CECE | 197.4 | 31.4 | 85 | 21.25 | 5.20 | 4.87 | 120 |
| EL-CECE | 216.8 | 55.0 | 85 | 18.75 | 4.08 | 4.41 | 134 |
| EL-CECE | 226.8 | 65.6 | 85 | 16.16 | 3.38 | 3.82 | 139 |
| EL-CECE | 237.2 | 76.2 | 85 | 14.37 | 2.89 | 3.42 | 144 |
| N-CECE | 177.0 | 0 | 85 | 22.84 | 6.32 | 5.03 | 107 |
| N-CECE | 197.4 | 31.4 | 76 | 22.82 | 7.08 | 4.82 | 95 |
| N-CECE | 216.8 | 55.0 | 69 | 22.78 | 8.03 | 4.55 | 83 |
| N-CECE | 226.8 | 65.6 | 66 | 22.82 | 8.31 | 4.53 | 80 |
| N-CECE | 237.2 | 76.2 | 63 | 22.81 | 8.56 | 4.42 | 78 |

Apart from the ability of the E-CECE process to withstand fluctuations in electrolytic cell availability, the E-CECE process also has application where a turned down CECE process is desirable, either temporarily or permanently. Optimization of a N-CECE process for maximum profit will yield a process having a relatively tight top concentration pinch in the first-stage catalytic exchange columns, giving high deuterium recovery and full scale production. This requires a large catalyst volume. In such a full-scale process, the catalyst costs are the dominant factor, typically 30–60% of the total investment cost. The economics governing any specific application could dictate that a N-CECE process be purposefully designed in a turned-down production mode, either initially or permanently. The conventional method of turning down a CECE process is to reduce the deuterium recovery by installing less than the optimum (for full-scale production) volume of catalytic exchange packing in the first stage columns. As the catalyst volume in the first stage is reduced, the amount of deuterium stripped from the exiting hydrogen gas is reduced.

The E-CECE process offers a cost-effective alternative method of turning down the production, or reducing the recovery, in a CECE process. Using some of the available electrolytic capacity as a pre-enrichment stage reduces the overall catalyst requirement and total capital cost compared to a N-CECE process operating at the same reduced production level.

The data listed in Table 2 reflect key parameters for a EL-CECE design in accordance with the present invention. All cases in Table 2 assume 160 ppm feed and a catalytic exchange column operating at 60° C. Stage 1 CECE column enrichment is to 1000 ppm in the water phase. The basis of comparison is an N-CECE process with an effluent of 55.4 ppm. An electrolytic cell separation factor of about 5 is assumed.

proportion of electrolytic cells in the pre-enrichment stage falls and the packing volume of the EL-CECE process approaches that of the N-CECE process.

Pre-enrichment of the feed water in an EL-CECE process lowers the catalyst requirements of the CECE portion of the process at the expense of increased deuterium losses as HD from the pre-enrichment stage hydrogen gas stream. Thus, the EL-CECE process has a lower capital cost than a N-CECE process with turned down production. Economic analysis has shown that the EL-CECE process is most cost effective at 45–75% of full scale (N-CECE optimized for maximum profit) production, offering a cost advantage of 12–22% depending on whether the comparable CECE process has three or four stages.

The data listed in Table 3 reflect the key parameters for a EG-CECE design in accordance with the present invention using the same assumptions as in Table 2.

TABLE 3

| Case | Flow to Column as % flow to cells | CECE exit hydrogen (ppm) | Packing Volume (%) | Production EG-CECE vs N-CECE (%) | Pre-cell electrolysis (% total) |
|---|---|---|---|---|---|
| 1 | 50.0 | 76.0 | 62 | 80 | 67 |
| 2 | 100.0 | 76.0 | 54 | 80 | 50 |
| 3 | 100.0 | 66.0 | 69 | 90 | 50 |
| 4 | 178.0 | 55.4 | 100 | 100 | 36 |
| 5 | 39.4 | 76 | 80 | 80 | 72 |

From Table 3, it is evident that just over one-third of the total of electrolysis can be outside the main CECE process envelope with no penalty on column packing volume or production.

Although the EL-CECE and EG-CECE flow sheets are different, both processes rely on the feed of a pre-enriched stream to the first CECE stage. With the EL-CECE process, transfer is with deuterium-enriched water to the top of the first stage catalytic exchange column 6 and this has the effect of causing a rather higher deuterium concentration in the hydrogen gas leaving column 6 and hence leaving the process. With the EG-CECE process, transfer of deuterium is in a hydrogen gas stream which subsequently passes through catalytic exchange column 52. This allows for recovery of more of the pre-enriched stream's deutrium content but the additional catalytic exchange column 52 adds to capital cost. Increasing the proportion of cells

TABLE 2

| Case | Pre-cell hydrogen (ppm) | Pre-cell condensate (ppm) | CECE exit hydrogen (ppm) | Packing Volume | Packing vol/unit production | Production E-CECE vs N-CECE | Pre-cell electrolysis (% total) |
|---|---|---|---|---|---|---|---|
| 1 | 70.0 | 350 | 121 | 25 | 36 | 70 | 68 |
| 2 | 60.0 | 300 | 104 | 35 | 44 | 78 | 58 |
| 3 | 50.0 | 250 | 87 | 48 | 56 | 86 | 45 |
| 4 | 45.0 | 225 | 77 | 60 | 67 | 90 | 36 |
| 5 | 40.0 | 200 | 66 | 84 | 88 | 96 | 25 |

The results in Table 2 show that the EL-CECE process in accordance with the present invention offers appreciable advantages particularly where total production is below about 85 to 90% of the ultimate potential production of an N-CECE process. For example, case 1 shows that by deploying 68% of the electrolytic cells in the pre-enrichment stage, an E-CECE process can achieve about 70% of the production of a comparable N-CECE process, with only 36% of the catalytic packing volume. At higher production levels, the deployed for pre-enrichment eventually leads to a bottleneck in catalytic exchange column 52 where the diminishing liquid to gas flow ratio leads to increasing height of exchange packing in column 52 with consequent deterioration in the process's economics as the liquid to gas flow ratio approaches the lower limit set by $1/\alpha$ (when 75% of the cells would comprise the pre-enrichment stage). The separation factor $\alpha$ defines the ratio of the concentrations of deuterium in water that is in equilibrium with deuterium in hydrogen.

It has been found that the EG-CECE process is most cost effective, compared to a N-CECE process at 75–90% of full scale production. With 50% of the electrolytic cells configured as a pre-enrichment stage, the EG-CECE process with three CECE stages has been shown to have a 16% lower capital investment than a three-stage N-CECE process and a 6% lower capital investment than a four stage N-CECE process.

Leakage of deuterium-enriched material from electrolytic cells has been considered to be a significant problem for N-CECE processes. Escape of hydrogen is a particular concern. Leakage reduces heavy water production. In the E-CECE process in accordance with the present invention, a substantial proportion of the electrolytic cells are deployed in the pre-enrichment stage where they operate at much lower deuterium concentrations than would be the case if deployed in a N-CECE process. As a result, the proportion of cells from which leakage is a severe problem is substantially reduced in a E-CECE process.

We claim:

1. In a combined electrolysis and catalytic exchange ("CECE") heavy water production system having a series of cascaded stages, each stage comprising a catalytic exchange column for passing liquid water in deuterium exchange relation with hydrogen gas and electrolysis cells for evolving from the liquid water stream from said catalytic exchange column a deuterium enriched liquid condensate, hydrogen gas and oxygen gas, wherein said hydrogen gas is returned to said catalytic exchange column and a portion of said deuterium enriched liquid condensate is passed to the catalytic exchange column of the next CECE stage;

a pre-enrichment stage comprising electrolysis cells for evolving from a liquid feed water stream that has not undergone catalytic exchange a deuterium enriched liquid condensate and hydrogen and oxygen gas streams containing deuterium enriched water vapour;

means for scrubbing deuterium enriched water vapour from said pre-enrichment stage hydrogen and oxygen gas streams with said feed water stream;

means for passing deuterium enriched liquid condensate from said pre-enrichment stage to the catalytic exchange column of the first CECE stage;

means for scrubbing deuterium enriched water vapour from the hydrogen gas stream from the catalytic exchange column of the first CECE stage with feed water thereto.

2. In a combined electrolysis and catalytic exchange ("CECE") heavy water production system having a series of cascaded stages, each stage comprising a catalytic exchange column for passing liquid water in deuterium exchange relation with hydrogen gas and electrolysis cells for evolving from the liquid water stream from said catalytic exchange column a deuterium enriched liquid condensate, hydrogen gas and oxygen gas, wherein said hydrogen gas is returned to said catalytic exchange column and a portion of said deuterium enriched liquid condensate is passed to the catalytic exchange column of the next CECE stage;

a pre-enrichment stage comprising electrolysis cells for evolving from a liquid water feed stream that has not undergone catalytic exchange a deuterium enriched liquid condensate, and hydrogen and oxygen gas streams containing deuterium enriched water vapour;

means for scrubbing deuterium enriched water vapour from said pre-enrichment stage oxygen stream with said feed water stream;

means for passing the hydrogen gas steam with its associated deuterium enriched water vapour from said pre-enrichment stage and the hydrogen gas from the first CECE stage in deuterium exchange relation with the liquid feed water to said first CECE stage.

3. A method for producing heavy water comprising deriving by electrolysis of a liquid feed water stream that has not undergone catalytic exchange a deuterium enriched liquid stream or a hydrogen gas stream containing deuterium enriched water vapour and applying said stream as a feed to a first stage of a combined electrolysis and catalytic exchange ("CECE") deuterium enrichment process.

4. The method of claim 3 wherein the feed is a deuterium enriched liquid stream derived from the electrolytic liquid condensate cells and is applied to the catalytic exchange column of the CECE process.

5. The method of claim 3 wherein the feed is the electrolytic hydrogen gas stream and is applied in deuterium exchange relation to enrich the liquid feed water in the first CECE stage.

6. A method of operating a combined electrolysis and catalytic exchange ("CECE") heavy water production plant to accommodate fluctuations between periods of greater and reduced electrical power availability, said CECE plant having a series of cascaded stages, each stage comprising a catalytic exchange column for passing liquid water in deuterium exchange relation with hydrogen gas and electrolysis cells for evolving from the liquid water stream from said catalytic exchange column a deuterium enriched liquid condensate, hydrogen gas and oxygen gas, wherein said hydrogen gas is returned to said catalytic exchange column and a portion of said deuterium enriched liquid condensate is passed to the catalytic exchange column of the next CECE stage, said electrolysis cells being present in sufficient numbers to consume available electrical power during said periods of greater availability, comprising:

deploying a sufficient number of said electrolysis cells in said CECE stages to consume expected available electrical power during periods of reduced availability;

deploying in a pre-enrichment stage the balance of said electrolysis cells applying feed water that has not undergone catalytic exchange to the pre-enrichment stage electrolysis cells during periods of greater electrical power availability and evolving therefrom a deuterium enriched liquid stream or a hydrogen stream containing deuterium enriched water vapour; and applying said pre-enrichment stream as a feed to the first CECE stage.

7. A method of operating a combined electrolysis and catalytic exchange ("CECE") heavy water production plant to accommodate fluctuations between periods of greater and reduced electrical power availability, said CECE plant having a series of cascaded stages, each stage comprising a catalytic exchange column for passing liquid water in deuterium exchange relation with hydrogen gas and electrolysis cells for evolving from the liquid water steam from said catalytic exchange column a deuterium enriched liquid condensate, hydrogen gas and oxygen gas, wherein said hydrogen gas is returned to said catalytic exchange column and a portion of said deuterium enriched liquid condensate is passed to the catalytic exchange column of the next CECE stage, said electrolysis cells being present in sufficient numbers to consume available electrical power during said periods of greater availability, comprising:

deploying a sufficient number of said electrolysis cells in said CECE stages to consume excess available electrical power during periods of greater availability and applying feed water that has not undergone catalytic exchange to the pre-enrichment stage electrolysis cells during periods of greater electrical power availability and evolving therefrom a deuterium enriched liquid stream or a hydrogen stream containing deuterium enriched water vapour and applying said pre-enrichment stream to a storage means; and applying the stored stream as a feed to the first CECE stage during periods of reduced electrical power availability.

8. A method of operating a combined electrolysis and catalytic exchange ("CECE") heavy water production plant in a turned down mode, said CECE plant having a series of cascaded stages, each stage comprising a catalytic exchange column for passing liquid water in deuterium exchange relation with hydrogen gas and electrolysis cells for evolving from the liquid water stream from said catalytic exchange column a deuterium enriched liquid condensate, hydrogen gas and oxygen gas, wherein said hydrogen gas is returned to said catalytic exchange column and a portion of said deuterium enriched liquid condensate is passed to the catalytic exchange column of the next CECE stage, said turned down mode being achieved by providing a less than optimum charge of catalyst in the catalytic exchange column of the first CECE stage, comprising deploying a sufficient number of available electrolysis cells in the first CECE stage commensurate with the reduction in catalyst charge;

deploying the balance of available electrolytic cells in a pre-enrichment stage for evolving from feed water that has not undergone catalytic exchange a deuterium enriched liquid stream or a hydrogen stream containing deuterium enriched water vapour; and applying said stream as a feed to said first CECE stage.

* * * * *